(12) United States Patent
Watanabe

(10) Patent No.: US 11,253,790 B2
(45) Date of Patent: Feb. 22, 2022

(54) NUMERICAL OPERATION SYSTEM

(71) Applicant: Hakushitorock Co., Ltd., Osaka (JP)

(72) Inventor: Issei Watanabe, Ikeda (JP)

(73) Assignee: Hakushitorock Co., Ltd., Osaka (JP)

( * ) Notice: Subject to any disclaimer, the term of this patent is extended or adjusted under 35 U.S.C. 154(b) by 0 days.

(21) Appl. No.: 17/288,453

(22) PCT Filed: Dec. 18, 2019

(86) PCT No.: PCT/JP2019/049609
§ 371 (c)(1),
(2) Date: Apr. 23, 2021

(87) PCT Pub. No.: WO2020/166199
PCT Pub. Date: Aug. 20, 2020

(65) Prior Publication Data
US 2021/0362068 A1 Nov. 25, 2021

(30) Foreign Application Priority Data

Feb. 13, 2019 (JP) .............................. JP2019-023616

(51) Int. Cl.
*A63H 33/04* (2006.01)
*A63F 13/46* (2014.01)
(Continued)

(52) U.S. Cl.
CPC ........... *A63H 33/042* (2013.01); *A63F 13/46* (2014.09); *G06K 7/1095* (2013.01);
(Continued)

(58) Field of Classification Search
CPC .... A63F 13/46; G06K 7/1095; A63H 33/042; A63H 33/046
(Continued)

(56) References Cited

U.S. PATENT DOCUMENTS

| 4,413,828 A | 11/1983 | Gardner |
| 2003/0148700 A1* | 8/2003 | Arlinsky ................. G09B 1/40 446/91 |

(Continued)

FOREIGN PATENT DOCUMENTS

| JP | H07-204314 A | 8/1995 |
| JP | 2017-537669 A | 12/2017 |

(Continued)

OTHER PUBLICATIONS

International Search Report issued in PCT/JP2019/049609; dated Mar. 17, 2020.
(Continued)

*Primary Examiner* — Michael D Dennis
(74) *Attorney, Agent, or Firm* — Studebaker & Brackett PC

(57) ABSTRACT

A numerical operation system for a plurality of individuals includes a contactless communication tag each included in a plurality of individuals, a reader allowed to read the contactless communication tag, and a control unit to which a result read by the reader is input, wherein the control unit is configured such as to acquire, from the result read by the reader, at least numerical values each corresponding to the plurality of individuals and operator symbols for operating the numerical values to calculate a total value based on the numerical values and the operator symbols.

7 Claims, 7 Drawing Sheets

(51) Int. Cl.
   *G06K 7/10* (2006.01)
   *G06K 19/07* (2006.01)
(52) U.S. Cl.
   CPC .. *G06K 19/0723* (2013.01); *A63F 2300/1031* (2013.01); *A63F 2300/61* (2013.01)
(58) Field of Classification Search
   USPC .......................................................... 446/91
   See application file for complete search history.

(56) References Cited

U.S. PATENT DOCUMENTS

| | | | | |
|---|---|---|---|---|
| 2008/0228450 | A1* | 9/2008 | Jakobsen | G06T 19/20 703/2 |
| 2009/0197658 | A1* | 8/2009 | Polchin | A63F 13/02 463/9 |
| 2010/0001923 | A1* | 1/2010 | Zilber | A63F 13/22 345/1.1 |
| 2011/0074833 | A1* | 3/2011 | Murayama | H05B 45/20 345/690 |
| 2014/0179446 | A1* | 6/2014 | Zuniga | A63F 13/98 463/47 |
| 2016/0101370 | A1* | 4/2016 | Madsen | A63F 3/04 446/91 |
| 2016/0310861 | A1* | 10/2016 | Hirata | A63F 13/327 |
| 2017/0200390 | A1* | 7/2017 | Seymour | G09B 5/02 |
| 2017/0282090 | A1* | 10/2017 | Chen | A63H 33/046 |
| 2019/0172269 | A1* | 6/2019 | Satoh | A63H 33/042 |

FOREIGN PATENT DOCUMENTS

| | | |
|---|---|---|
| KR | 10-2009-0054882 A | 6/2009 |
| KR | 10-2009-0054883 A | 6/2009 |
| KR | 10-2018-0046242 A | 5/2018 |

OTHER PUBLICATIONS

Written Opinion issued in PCT/JP2019/049609; dated Mar. 17, 2020.
"Decision to Grant a Patent" Office Action issued in JP 2019-023616; mailed by the Japanese Patent Office dated Apr. 11, 2019.
"Notice of Reasons for Refusal" Office Action issued in JP 2019-023616; mailed by the Japanese Patent Office dated Feb. 28, 2019.

* cited by examiner

NUMERICAL OPERATION SYSTEM

TECHNICAL FIELD

The present invention relates to a numerical operation system for a plurality of individuals, and more specifically to a numerical operation system for a plurality of individuals in which contactless communication tags are used.

BACKGROUND ART

Patent Document 1 discloses a conventional game system. The game system disclosed in the Patent Document 1 includes a plurality of toy elements, an RFID tag provided in each of the toy elements, and a reader for reading the RFID tag. The reader detects existence of the toy elements in an area.

CITATION LIST

Patent Literature

Patent Literature 1: Japanese Translation of PCT International Application Publication No. 2017-537669

SUMMARY OF INVENTION

Technical Problem

By the way, in the game system disclosed in the Patent Document 1 is not the one that information acquired from a plurality of pieces of identification information of the toy elements is calculated.

The present invention has been made in view of the above circumstances, and an object thereof is to provide a numerical operation system for a plurality of individuals by which numerical values respectively associated with the plurality of the individuals can be easily totaled.

Solution to Problem

A numerical operation system for a plurality of individuals of one aspect according to the present invention includes a contactless communication tag each included in a plurality of individuals, a reader allowed to read the contactless communication tag, and a control unit to which a result read by the reader is input. The control unit is configured such as to acquire, from the result read by the reader, at least numerical values each corresponding to the plurality of individuals and operator symbols for operating the numerical values to calculate a total value based on the numerical values and the operator symbols.

A numerical calculation method for a plurality of individuals of one aspect according to the present invention is executed in any one of a reader, a communication terminal and a server each including a control unit, and the control unit, to which a result read by a reader allowed to read a contactless communication tag each included in a plurality of individuals is input, executes a step of acquiring, from the result read by the reader, at least numerical values each corresponding to the plurality of individuals and operator symbols for operating the numerical values to calculate a total value based on the numerical values and the operator symbols.

A program of one aspect according to the present invention is a program causing a control unit, to which a result read by a reader allowed to read a contactless communication tag each included in a plurality of individuals is input, to execute a step of acquiring, from the result read by the reader, at least numerical values each corresponding to the plurality of individuals and operator symbols for operating the numerical values to calculate a total value based on the numerical values and the operator symbols.

Effect of the Invention

The numerical operation system for the plurality of the individuals according to the aspect of the present invention aforementioned has an advantage that the numerical values respectively associated with the individuals can be easily totaled.

DESCRIPTION OF EMBODIMENTS

(1) Preferred Embodiment 1

Hereinafter, a numerical operation system for a plurality of individuals (Hereinafter, referred to as the numerical operation system) according to the present preferred embodiment shall be described in detail.

Figure 1:
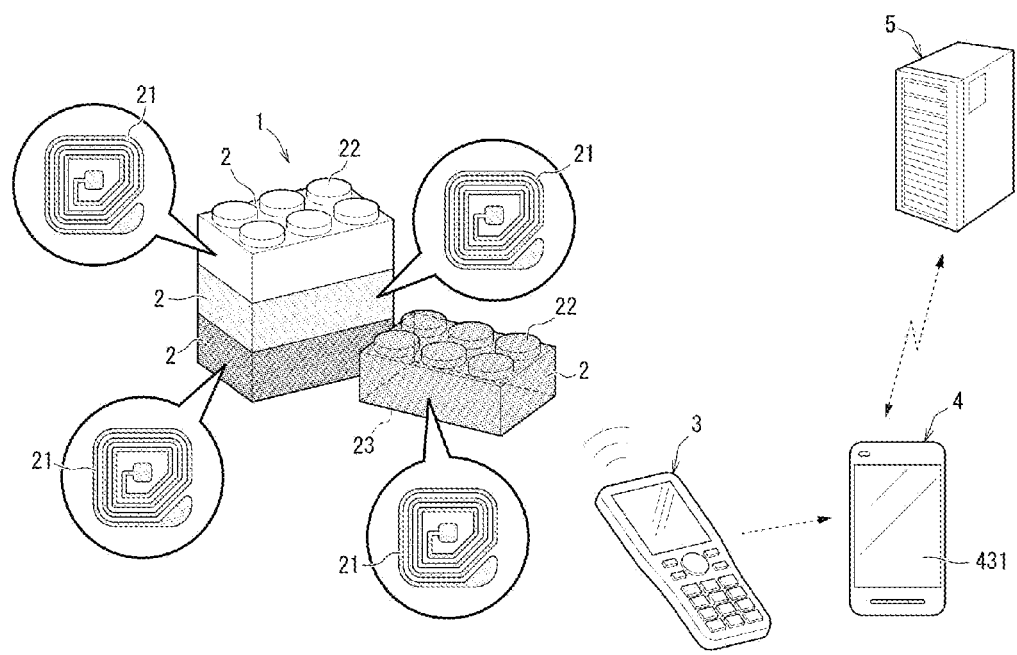
FIG. 1 is a schematic diagram of a numerical operation system for a plurality of individuals of preferred embodiment 1 according to the present invention.

The numerical operation system according to the present preferred embodiment is a system in which an assembly block toy is used. As shown in FIG. 1, the assembly block toy according to the present preferred embodiment includes a plurality of assembly blocks 2 as the plurality of the individuals.

The numerical operation system according to the present preferred embodiment has the plurality of the assembly blocks 2, a plurality of contactless communication tags (Hereinafter, referred to as IC tags 21), a reader 3, a communication terminal 4, a server 5 having a control unit 6. In the numerical operation system according to the present preferred embodiment, the communication terminal 4 is communicatively connected to the reader 3 and the server 5 via communication networks, and is connected such as to allow electrical signals to be transmitted and received bidirectionally. In short, in the numerical operation system according to the present preferred embodiment, communications between the reader 3 and the server 5 are performed in the communication terminal 4. However, in the present disclosure, the reader 3 and the server 5 may be configured such as to be communicable directly via a communication network, and the communication terminal 4 may not be provided.

(1.1) Communication Network

The communication network is a bidirectional network in which the communication terminal 4 communicates with the reader 3 or the server 5 in each other. In the present preferred embodiment, the communication network between the communication terminal 4 and the reader 3 is Bluetooth (registered trademark), and the communication network between the communication terminal 4 and the server 5 is an internet.

As the communication network according to the present disclosure, for example, a mobile data communication network such as a transmission control protocol/internet protocol (TCP/IP), GSM (registered trademark), CDMA, and LTE, or Bluetooth (registered trademark), Wi-Fi (registered trademark), Z-WAVE, Insteon, EnOcean, ZigBee, HomePlug (registered trademark), MQTT (Message Queueing Telemetry Transport), XMPP (extensible messaging and presence protocol), or CoAP (constrained application protocol), or a combination thereof is exemplified. The communication network may be a network with a limited communication range such as a corporate network.

(1.2) Hardware Configuration (1.2.1) Assembly Block

As shown in FIG. 1, each of the assembly blocks 2 has a block body having a recess portion 23, and a plurality of protruding portions 22 provided on the block body. The plurality of the assembly blocks 2 according to the present preferred embodiment are to be coupled to each other by fitting the protruding portion 22 into the recess portion 23.

However, in the numerical operation system according to the present disclosure, the coupling of the plurality of the assembly blocks 2 is not limited to the fitting of the recess portion 23 and the protruding portion 22, and may be realized by, for example, a coupling by magnets, a coupling by a pin, a coupling by an adhesion, or the like.

The assembly blocks 2 are assembled by using arbitrary assembly blocks 2 from among the large number of the assembly blocks 2. The assembling of the assembly blocks 2 is performed as user wishes, and the assembly blocks 2 in the assembled state may have a shape imitating, for example, a robot, a vehicle, a monster, a car, a person, an animal, a building, or the like. In the present preferred embodiment, the assembly blocks 2 in the assembled state are referred to as an "aggregate 1". That is, "the aggregate 1" in the present disclosure means the plurality of the individuals gathered in a certain range.

(1.2.2) IC Tag (Contactless Communication Tag)

The IC tag 21 is a tag having unique identification information, and the identification information stored in the IC tag 21 is read by the reader 3. The IC tag 21 according to the present preferred embodiment is an RF (Radio Frequency) tag. The IC tag 21 according to the present preferred embodiment is a passive tag, but may be an active tag or a semi-active tag. A frequency band of the IC tag 21 is preferably a UHF band, but may be, for example, an HF band, a short wave band including NFC (Near Field Communication), or the like.

The IC tag 21 is attached to each of the assembly blocks 2. The attachment of the IC tag 21 to each of the assembly blocks 2 may be realized not only by fixing with a seal but also by adhesion, embedding into the assembly block 2 or the like. The IC tag 21 may be attached to any position of the outer surface, of the inner surface, or within thickness, in the assembly block 2.

(1.2.3) Reader

The reader 3 is allowed to read the information stored in the IC tags 21. The information (reading information) read by the reader 3 is output to the communication terminal 4. The reader 3 according to the present preferred embodiment is a read-only, but the reader 3 according to the present disclosure may be a reader/writer allowed to read and write the information with respect to the IC tag 21.

The reader 3 is a handy type in the present preferred embodiment, but may be, for example, a gate type, a stationary type, or the like in the present disclosure.

(1.2.4) Communication Terminal

The communication terminal 4 receives the reading information transmitted from the reader 3, and transmits the received reading information to the server 5. The communication terminal 4 has a display 431. The communication terminal 4 according to the present preferred embodiment is a smartphone. However, the communication terminal 4 according to the present disclosure may be an information terminal such as a personal computer, a tablet terminal, and a PDA. The communication terminal 4 is communicatively connected to the server 5 bidirectionally via the communication network.

(1.2.5) Server

The server 5 receives the reading information transmitted from the reader 3 via the communication terminal 4, and executes various processes. The server 5 has a computer and a communication interface.

The communication interface is an interface that communicates with the communication terminal 4 via the communication network. The communication interface is a wireless LAN interface in the present preferred embodiment, but may be, for example, a wired LAN interface, a wireless WAN, a wired WAN or the like in the present disclosure.

The computer has a main storage device, an auxiliary storage device and a processor allowed to execute a control program. The main storage device is a so-called main memory, and is a volatile storage area (e.g. RAM). The auxiliary storage device is a device that stores the control program and the like, and is a non-volatile storage area (e.g. ROM). The non-volatile storage area is not limited to the ROM, and may be, for example, a hard disk, a flash memory, or the like.

The processor has a microcontroller, as a main component, having one or more processors and one or more memories. That is, a program stored in the memory of the microcontroller is executed by the processor of the microcontroller, so that various functions (e.g. a function of the control unit 6 described later) are realized. The program may be stored in the memory in advance, or may be provided by being stored in a non-temporary recording medium such as a memory card.

(1.3) Functional Configuration

Next, a functional configuration of the numerical operation system according to the present preferred embodiment shall be described.

(1.3.1) Reader

Figure 2:
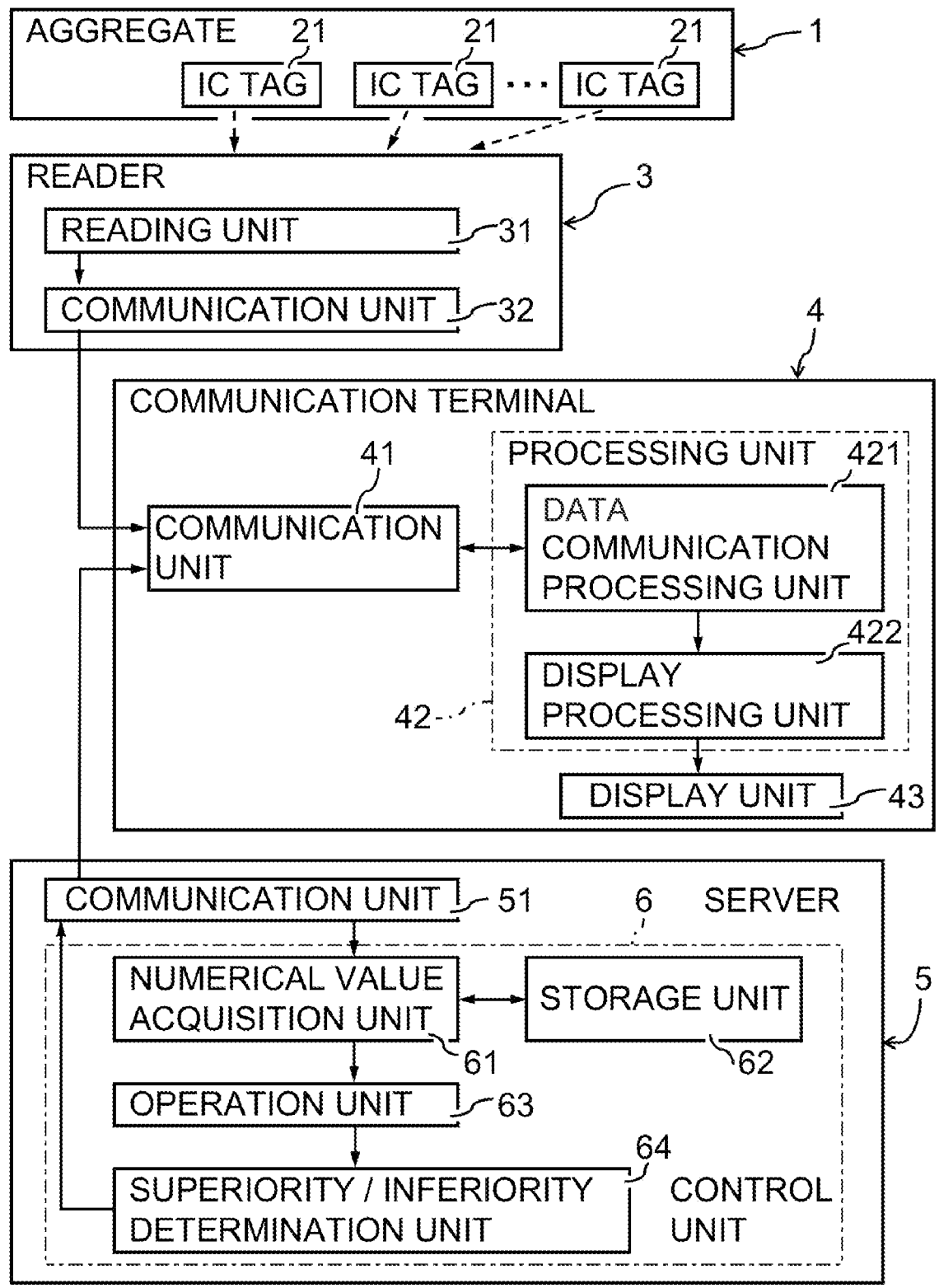
FIG. 2 is a block diagram of the numerical operation system.

As shown in FIG. 2, the reader 3 has a reading unit 31 and a communication unit 32.

The reading unit 31 reads the unique identification information stored in each of the IC tags 21. The reading unit 31 is allowed to read all the identification information simultaneously, regarding the plurality of the IC tags 21 included in the aggregate 1. The reading unit 31 reads the unique identification information from each of the IC tags 21 and outputs the read information to the communication unit 32 as the reading information.

Here, "simultaneously" means that an input or a processing of the information is not executed in series, but executed in parallel. Therefore, "to read simultaneously" does not require a timing of reading information to be exactly the same.

The communication unit 32 transmits the reading information input from the reading unit 31 to the communication terminal 4. The communication unit 32 according to the present preferred embodiment is communicatively connected to the communication terminal 4 bidirectionally via the communication network. The communication unit 32 is therefore allowed to transmit the reading information via the communication network.

(1.3.2) Communication Terminal

The communication terminal 4 has a communication unit 41, a processing unit 42, and a display unit 43.

The communication unit 41 establishes a communication connection with the reader 3 therebetween to communicate with the reader 3 via the communication network. The communication unit 41 also establishes a communication connection with the server 5 therebetween to communicate with the server 5 bidirectionally. The communication unit 41 receives the reading information transmitted from the communication unit 41 of the reader 3, and outputs the received reading information to the processing unit 42. The communication unit 41 also transmits the reading information input from the processing unit 42 to the server 5, or receives the information transmitted from the server 5 and outputs to the processing unit 42. The communication unit 41 according to the present preferred embodiment is realized by a communication interface, a control circuit, or the like.

The processing unit 42 executes various processes based on the information (e.g. the reading information) input from the communication unit 41. The processing unit 42 has a data communication processing unit 421, and a display processing unit 422.

When the data communication processing unit 421 determines that the information input from the communication unit 41 is the reading information transmitted from the reader 3, the data communication processing unit 421 returns the reading information to the communication unit 41 and allows the communication unit 41 to transmit the reading information to the server 5. On the other hand, when the data communication processing unit 421 determines that the information input from the communication unit 41 is information (operation information, etc.) transmitted form the the server 5, the data communication processing unit 421 outputs said information to the display processing unit 422.

The display processing unit 422 controls the display unit 43 by using the operation information input from the data communication processing unit 421. The display unit 43 according to the present preferred embodiment is the display 431 (see FIG. 1) included in the communication terminal 4. The display processing unit 422 is, for example, allowed to control numerical values, graphics, or the like to be displayed on the display unit 43 based on the operation information. The display processing unit 422 may also control a speaker and may allow the speaker to output a sound corresponding to a graphic.

(1.3.3) Server

The server 5 has a communication unit 51, and a control unit 6.

The communication unit 51 establishes a communication connection with the communication terminal 4 therebetween to communicate with the communication terminal bidirectionally via the communication network. The communication unit 51 receives the reading information transmitted from the communication terminal 4, and outputs the received reading information to the control unit 6. The communication unit 51 according to the present preferred embodiment may be realized by a communication interface, a computer, or the like.

The control unit 6 acquires numerical values and operator symbols each corresponding to the assembly blocks 2 from the reading information input from the communication unit 51, and executes an operation based on the numerical values and the operator symbols. The control unit 6 has a numerical value acquisition unit 61, a storage unit 62, an operation unit 63, and a superiority/inferiority determination unit 64.

The numerical value acquisition unit 61 acquires the predetermined numerical value and the predetermined operator symbol by using the reading information including the unique identification information of the IC tag 21. The numerical value acquisition unit 61 according to the present preferred embodiment acquires the numerical value and the operator symbol from the storage unit 62 with referring to the identification information included in the reading information.

In the storage unit 62, one or more numerical values assigned to the unique identification information, the operator symbol assigned to each of the numerical values, and a unit assigned to each of the numerical values are stored. "The operator symbol" in the present disclosure is a symbol used in an operation, and, for example, a symbol used in a four arithmetic operation (a plus sign "+", a minus sign "−", a multiplication symbol "×", and a division symbol "÷"), a symbol used such in a square root (a root sign "$\sqrt{\phantom{-}}$"), and the like are cited. "The unit" in the present disclosure means a classification to be a reference for comparison. For example, "Physical strength P" as the unit assigned to the numerical value indicating a physical strength, "attack P" as the unit assigned to the numerical value indicating an attack power, "defense P" as the unit assigned to the numerical value indicating a defense power, and the like are cited. As a data stored in the storage unit 62, for example, "+300 attack P" and "−100 defense P" are assigned with respect to one piece of the identification information. As another example, "×3 physical strength P" may be assigned to one piece of the identification information.

The information acquired by the numerical value acquisition unit 61 is output to the operation unit 63.

The operation unit 63 performs an operation processing based on the information input from the numerical value acquisition unit 61. Since the information including the numerical values, the operator symbols and the units assigned to the plurality of pieces of the unique identification information is input to the operation unit 63, per each unit, the numerical values are totaled with reference to the operator symbols, and information (the operation information) indicating a total value is generated.

Here, a predetermined rule may be set in the operation processing, in addition to a general calculation method used in four arithmetic operations. For example, in a case in which the multiplication symbols "×" are included in some of the operator symbols among the plurality of the numerical values, the operation processing related to the plus sign "+" or the minus sign "−" is preferentially executed, and a multiplication may be performed to a numerical value obtained after the operation processing related to the plus sign "+" or the minus sign "−".

The operation information acquired by the operation of the operation unit 63 is output to the superiority/inferiority determination unit 64.

When two or more pieces of the operation information are input from the operation unit 63, the superiority/inferiority determination unit 64 compares the total values each included in the plurality of pieces of the operation information to determine superiority/inferiority. For example, in a case in which operation information of a first aggregate and operation information of a second aggregate are input, the "physical strength P" of the second aggregate is calculated from the difference between the "attack P" of the first aggregate and the "defense P" of the second aggregate, the "physical strength P" of the first aggregate is calculated in the same way, and then the calculated "physical strengths P" are compared with each other and the one having a large value is to be determined as "winning". Of course, other factors may be taken into account in the determination of the superiority/inferiority. The superiority/inferiority information determined in the superiority/inferiority determination unit 64 and the operation information are output to the communication unit 51.

The communication unit 51 transmits the superiority/inferiority information and the operation information input from the superiority/inferiority determination unit 64 to the communication terminal 4 via the communication network.

(1.4) Process

Figure 3:
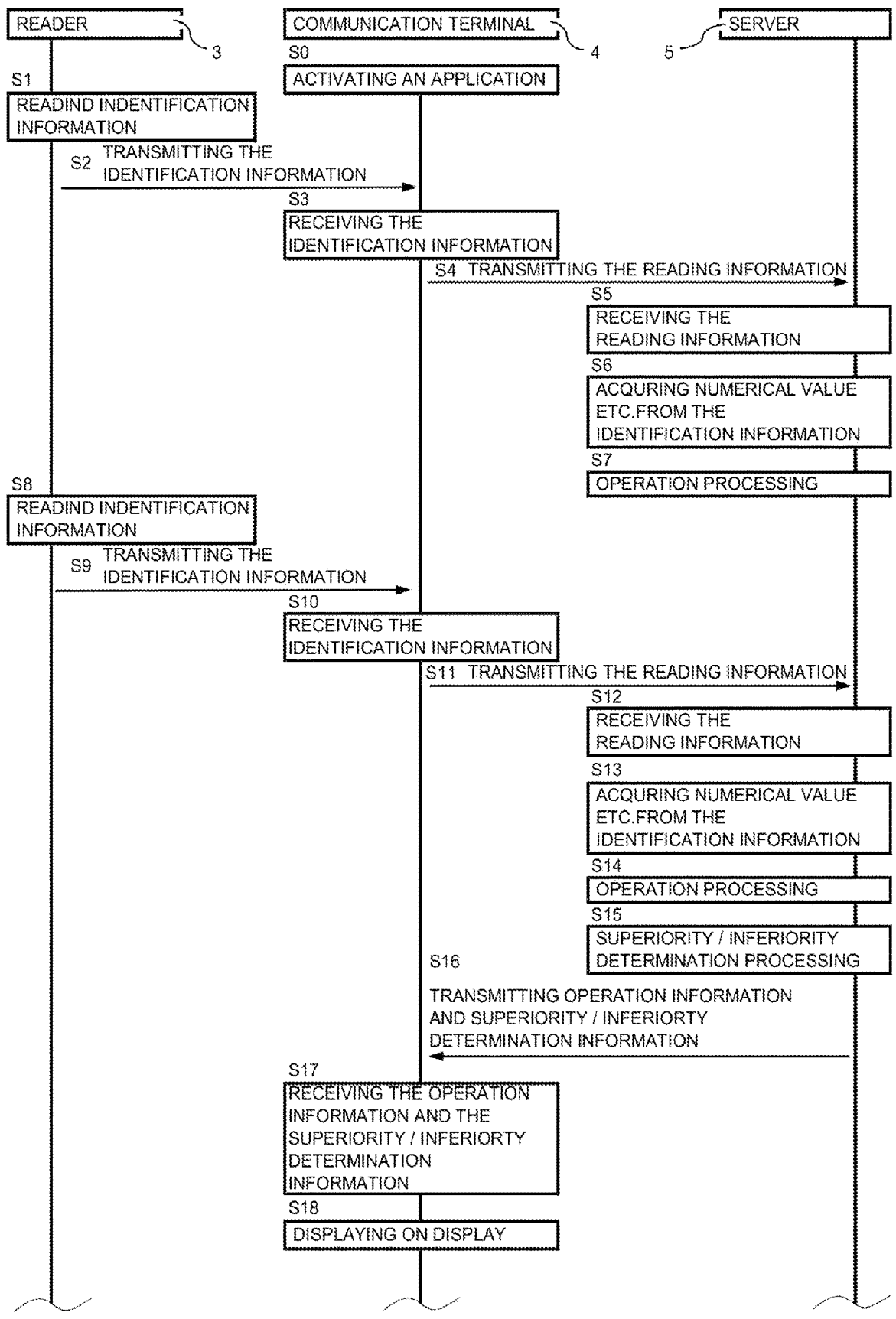
FIG. 3 is a sequence diagram of the numerical operation system.

Next, a process of the numerical operation system according to the present preferred embodiment shall be described with reference to FIG. 3. FIG. 3 is a sequence diagram showing an example of the process of the numerical operation system according to the present preferred embodiment.

A user activates the communication terminal 4 and allows the communication terminal 4 to be in a communicative state with the reader 3. As the communicative state, for example, a state in which an application (an app) of the communication terminal 4 is activated, and the reader 3 and the communication terminal 4 are paired by Bluetooth (registered trademark) is exemplified (S0).

The user reads the identification information with the reader 3 for one aggregate 1 (the first aggregate) assembled by using the plurality of the assembly blocks 2 (S1). The reader 3 transmits the reading information to the communication terminal 4 via the communication network (S2).

The communication terminal 4 receives the reading information (S3). Hereupon, the data communication processing unit 421 determines that the reading information is the one transmitted from the reader 3, and transmits said reading information to the server 5 (S4).

The server 5 receives the reading information, and acquires the numerical values, the operator symbols and the units from the identification information included in the reading information to execute the operation processing (S5 to S7).

The user reads the identification information by using the reader 3 for the other aggregate 1 (the second aggregate) (S8). The reader 3 transmits the reading information regarding the second aggregate 1 to the communication terminal 4 via the communication network (S9).

The communication terminal 4 receives the reading information, and transmits said reading information to the server 5 (S10, S11).

The server 5 receives the reading information regarding the second aggregate, and acquires the numerical values, the operator symbols and the units from the identification information included in the reading information to execute the operation processing (S12 to S14). Then, the server 5 compares an operation result regarding the first aggregate and an operation result regarding the second aggregate to execute superiority/inferiority determination processing (S15). The server 5 transmits the operation information and superiority/inferiority determination information to the communication terminal 4 after executing the superiority/inferiority determination process (S16).

The communication terminal 4 receives the operation information and the superiority/inferiority determination information, and displays the result thereof on the display 431 (S17, S18).

Figure 4:
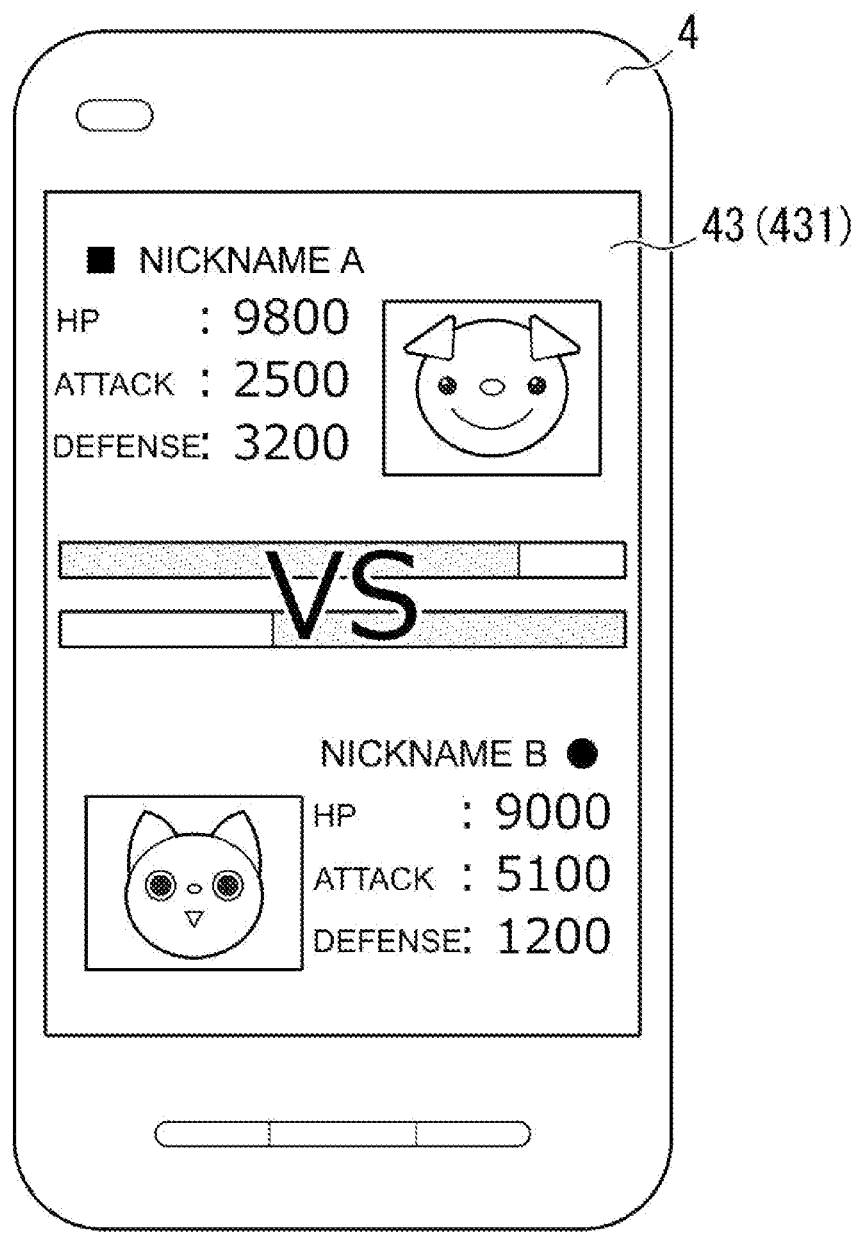
FIG. 4 is a diagram showing a display example of a display unit of the numerical operation system.

In FIG. 4, a display example of the display unit 43 is shown. In the display unit 43, for the first aggregate (here, "nickname A"), "HP: 9800" is displayed as an indication and a value indicating the physical strength P, "Attack: 2500" is displayed as an indication and a value indicating the attack strength P, and "Defense: 3200" is displayed as an indication and a value indicating the defense strength P. The indications and values regarding the second aggregate (here, "nickname B") are also displayed in the same manner.

After the display shown in FIG. 4, the screen transits to a screen displaying a superiority/inferiority determination. As a display of superiority/inferiority in a case in which the nickname A is determined to be "superior" and the nickname B is determined to be "inferior", for example, superiority/inferiority is to be displayed by executing processing such as blinking the nickname A, and turning off the display of the nickname B. Of course, as a display indicating "superior", for example, an indication such as "crown", "circle", and "star" may be added in addition to the display shown in FIG. 4.

(2) Modification Example 1

The preferred embodiment aforementioned is only one of various embodiments of the present disclosure. The preferred embodiment can be variously modified according to the design or the like as long as the object of the present disclosure can be achieved. Hereinafter, the modification example of the preferred embodiment 1 shall be described.

In the numerical operation system according to the preferred embodiment aforementioned, the server 5 transmits the operation information and the superiority/inferiority determination information acquired from the unique identification information to the communication terminal 4, but the numerical operation system according to the present modification example is different form the numerical operation system according to the preferred embodiment aforementioned in that a graphic data is transmitted in addition to the operation information and the superiority/inferiority determination information. The preferred embodiment land the modification example 1 are the same in that the numerical values corresponding to each of the individuals, the operator symbols for operating the numerical values, and the units each corresponding to the numerical values are acquired by using the unique identification information to calculate the total value based on the numerical values, the operator symbols and the units.

Figure 6:
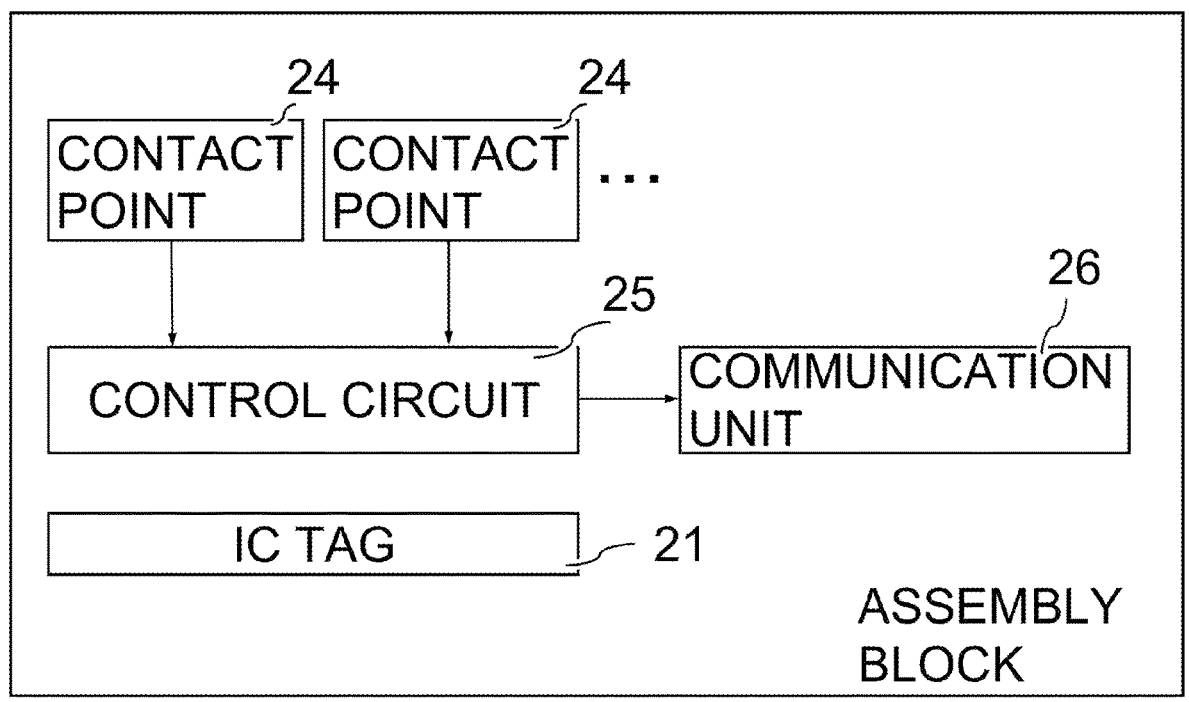
FIG. 6 is a block diagram of the assembly block.

Each of the assembly blocks 2 according to the present modification example 1 has, as shown in FIG. 6, a plurality of contact points 24, a communication unit 26 and a control circuit 25. Each of the assembly blocks 2 includes the contactless communication tag 21 as in the embodiment 1, but the description thereof is omitted here.

Figure 5:
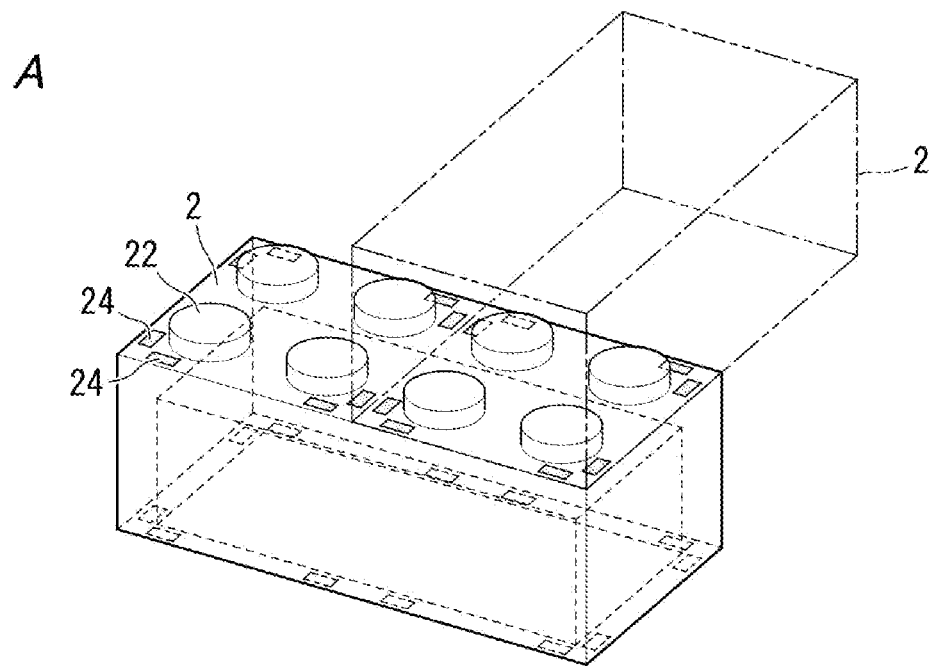
FIG. 5A is a perspective view of an assembly block of a numerical operation system according to a modification example 1.
FIG. 5B is a plane view of the assembly block of the numerical operation system according to the modification example 1.
FIG. 5C is a bottom view of the assembly block of the numerical operation system according to the modification example 1.
Figure 5:
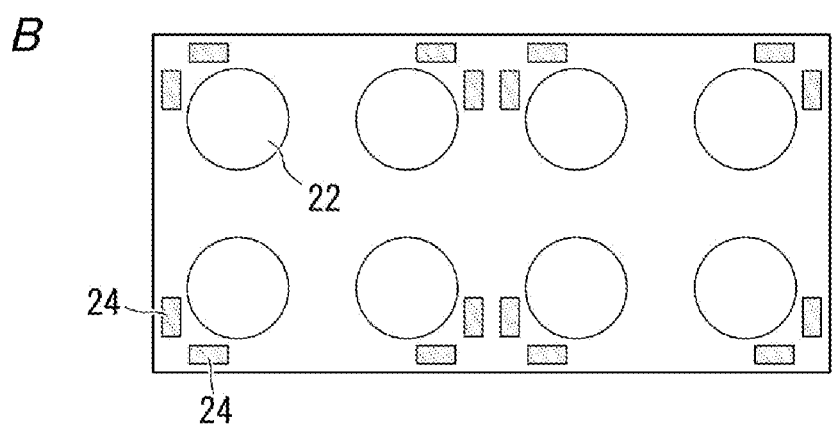
Figure 5:
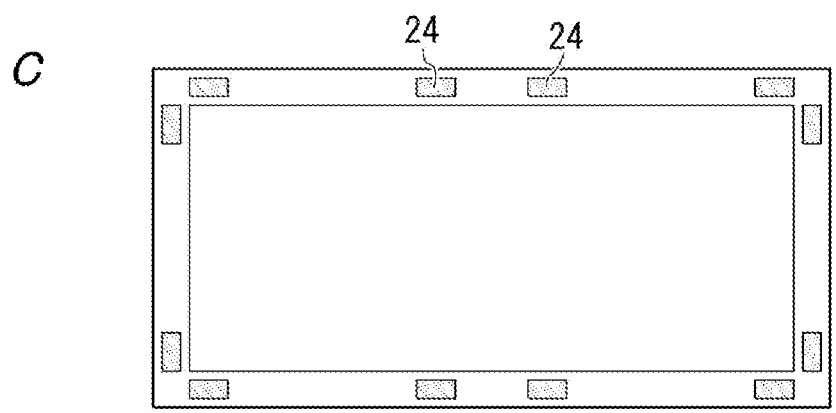

As shown in FIG. 5, the plurality of the contact points 24 are arranged at positions in which the contact points 24 of the adjacent other assembly block 2 can be brought into contact. For example, when one assembly block 2 and the other adjacent assembly block 2 are to be coupled together, in a case in which they coupled such as to overlap each other as viewed in plan, the plurality of the contact points 24 come into contact with the plurality of contact points 24 of the other block in a one-to-one correspondence. When one assembly block 2 and the other adjacent assembly block 2 are to be coupled together, in a case in which they coupled such that longitudinal directions of each other are to be orthogonal (e.g. see the imaginary line in FIG. 5A), some of the contact points 24 of the plurality of the contact points 24 are free from coming into contact with the contact points 24 of the other block.

The control circuit 25 is configured to allow electrical signals to transmit and receive with respect to the plurality of the contact points 24. The control circuit 25 is allowed to recognize an ON (contact) state or OFF (non-contact) state, regarding the plurality of the contact points 24. The control circuit 25 is also allowed to refer the identification information stored in each of the IC tags 21. The control circuit 25 therefore is allowed to recognize which relative direction and which relative posture the specific assembly block 2 having the individual identification information has with respect to the adjacent assembly block 2 having the other identification information. Hereinafter, that information is referred to as "position and orientation information". "ON" here means that the contact points 24 are connected to each other and the circuit is closed. On the other hand, "OFF" means that the contact points 24 are separated from each other.

Figure 7:
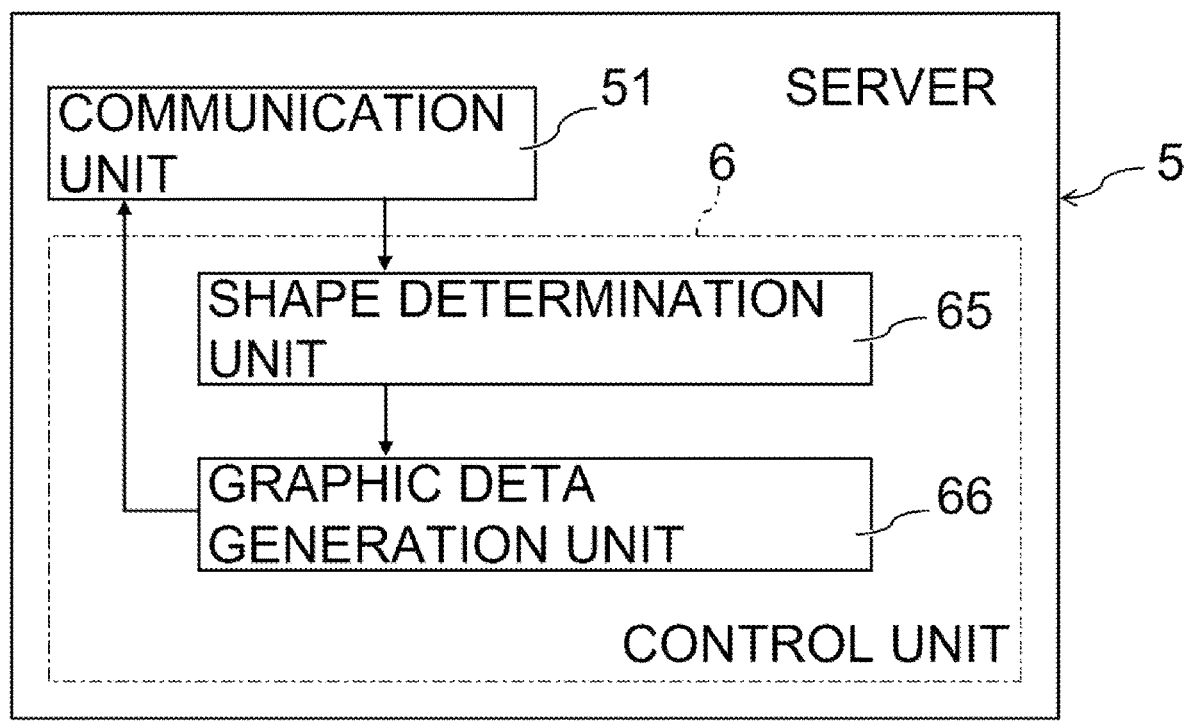
FIG. 7 is a block diagram of the server.

The communication unit 26 is controlled by the control circuit 25, and allows the position and orientation information to be transmitted to the server 5 (see FIG. 7). Specifically, the communication unit 26 transmits the position and orientation information to the server 5 via the communication terminal 4 in the same way as the preferred embodiment aforementioned.

As shown in FIG. 7, the server 5 has the communication unit 51 and the control unit 6. Since a point that the control unit 6 has the numerical value acquisition unit 61 (see FIG. 2), the storage unit 62 (see FIG. 2), the operation unit 63 (see FIG. 2) and the superiority/inferiority determination unit 64 (see FIG. 2) is the same as the preferred embodiment aforementioned, the description thereof is omitted. The control unit 6 according to the present modification example 1 has a shape determination unit 65 and a graphic data generation unit 66.

The shape determination unit 65 determines a whole shape of the aggregate 1 from the position and orientation information of each of the assembly blocks 2. The shape determination unit 65 outputs the information, in which the whole shape of the aggregate 1 is determined, to the graphic data generation unit 66.

The graphic data generation unit 66 generates graphic data by using the information determined in the shape determination unit 65. The graphic data is graphic data to be displayed on the display unit 43 of the communication terminal 4. The graphic data generated by the graphic data generation unit 66 is output to the communication unit 51, and transmitted to the communication terminal 4 by the communication unit 51.

In the communication terminal 4 that received the graphic data, the processing unit 42 displays an image (including a moving image) on the display unit 43 based on the graphic data. The image based on the shape of the aggregate 1 is thereby displayed on the communication terminal 4. As described above, in the numerical operation system according to the modification example, not only the displaying of the numerical values and the superiority/inferiority but also the displaying of the image based on the shape of the aggregate 1 can be performed.

(3) Preferred Embodiment 2

The numerical operation system according to the preferred embodiment 1 is the system in which the assembly blocks 2 are used as the plurality of the individuals, but the present preferred embodiment is a system in which a plurality of commodities such as foodstuffs such as vegetables and meats, and kitchen goods are used as the plurality of the individuals. With the numerical operation system according to the present preferred embodiment, total amount of money of the plurality of the commodities in a shopping basket can be calculated.

The shopping basket according to the present preferred embodiment is, for example, used in a store such as a supermarket, a greengrocer, a convenience store, and a department store. A user puts the commodities served as the individuals into the shopping basket. In the present preferred embodiment, one aggregate 1 is composed of the plurality of the commodities put into the shopping basket.

A price tag including the IC tag 21 is attached to each of the commodities according to the present preferred embodiment. In the IC tag 21, unique identification information corresponding to each of the commodities is stored.

The server 5 has the control unit 6 as is the case with the preferred embodiment 1. The control unit 6 has the storage unit 62. In the storage unit 62, for each piece of the identification information, one numerical value indicating the price of the commodity and the operator symbol (here, "+") for calculating the numerical value are assigned and stored. The numerical value acquisition unit 61 acquires corresponding one numerical value and the operator symbol (here, "+") for calculating one numerical value with reference to the input identification information as is the case with the preferred embodiment 1. The operation unit 63 operates a total value from the numerical values and the operator symbols acquired by the numerical value acquisition unit 61.

That is, also in the numerical operation system according to the present preferred embodiment, the control unit 6 acquires at least the numerical values each corresponding the individuals and the operator symbols for operating the numerical values from the result read by the reader 3 to calculate the total value based on the numerical values and the operator symbols. With the numerical operation system according to the present preferred embodiment, it is therefore possible to calculate the total amount of money of the plurality of commodities put in the shopping basket. As a result, it is possible to reduce the number of cash register operators, so that, for example, an unmanned store can be realized.

The control unit 6 may output the operated operation information, for example, to a monitor served as the display unit 43, or may output a liquid crystal display attached to the shopping basket.

Also, for example, the aggregate 1 may be configured with the vegetables as commodities and a signboard placed vicinity of the vegetables. The signboard may include the IC tag 21 and may allow a discount operation to be executed with the numerical values and the operator symbols each corresponding to the IC tags 21. Also, a discount tag may be placed, and the operation may be executed in a state in which the commodities and said tag are put into the shopping basket. Also, since the unique identification information is respectively stored in the IC tags 21, an inventory management can be easily performed.

(4) Other Modification Examples

Hereinafter, modification examples of the preferred embodiments shall be listed. The modification examples to be described below can be applied in combination with the preferred embodiments 1 to 2 and the modification example 1 aforementioned as appropriate.

In the preferred embodiments 1 to 2 and the modification example 1 aforementioned, the unique identification information is stored in the IC tags 21, and the numerical values and the operator symbols stored in the server 5 are acquired from the identification information, but, in the present disclosure, information including one or more numerical values and operator symbols may be stored in the IC tag 21 in advance, and the operation may be executed in the server 5 based on the information including one or more numerical values and operator symbols.

In the preferred embodiments 1 to 2 and the modification example 1 aforementioned, the reader 3 and the server 5 are communicatively connected via the communication terminal 4, but the reader 3 and the server 5 may be connected via the communication network. The control unit 6 included in the server 5, for example, may be provided integrally with the reader 3 or may be realized by the control circuit of the communication terminal 4.

In the preferred embodiments 1 to 2 and the modification example 1 aforementioned, the numerical value and the operator symbol corresponding to the numerical value are stored in the storage unit 62, but a mathematical expression such as "X+Y+Z=total value" may be stored as the operator symbol, and the operation may be executed by substituting each of the numerical values into the mathematical expression.

The control unit 6 may store "coefficient" in addition to "numerical value", "operator symbol", and "unit". For example, the total value after the operation can be increased by increasing the coefficient according to the rarity of assembly block 2.

In the preferred embodiments 1 to 2 and the modification example 1 aforementioned, the communication terminal 4 has the display unit 43, but the communication terminal 4 may be free from the display unit 43. In this case, the communication terminal 4 may be an access point, a wireless LAN router, or the like. The display unit 43 may be provided separately from the communication terminal 4.

In the modification example 1 aforementioned, the graphic data is transmitted from the server 5 to the communication terminal 4 based on the position and orientation information of the assembly blocks 2, but, for example, in the storage unit 62 of the server 5, the graphic data may be assigned to the operated total value and stored, and an image according to the total value may be displayed on the communication terminal 4. The display of the image on the display unit 43 may randomly acquire the graphic data.

In the modification example 1 aforementioned, information including the relative orientation and posture of the assembly block 2 is acquired, but information including an absolute orientation of the assembly blocks 2 may be acquired. In this case, for example, an acceleration sensor may be provided to each of the assembly blocks 2. Also, other than this, a gyro sensor may be provided to each of the assembly blocks 2.

The numerical operation system according to the preferred embodiments 1 to 2 and the modification example 1 aforementioned has the reader 3 dedicated for reading the identification information of the IC tag 21, but the communication terminal 4 such as the smartphone may have the reader 3. For example, all of the functions of the reader 3, the control unit 6 and the display unit 43 can be realized by the smartphone, and the communication network is unnecessary in this case. In short, the communication network is not always necessary.

(5) Aspect

As described in above, the numerical operation system for the plurality of the individuals according to the first aspect has the contactless communication tag 21 each included in the plurality of the individuals, the reader 3 allowed to read the contactless communication tag 21, and the control unit 6 to which the result read by the reader 3 is input. The control unit 6 acquires, from the result read by the reader 3, at least the numerical values each corresponding to the individuals and the operator symbols for operating the numerical values to calculate the total value based on the numerical values and operator symbols.

According to this aspect, since the operation for the numerical values corresponding to the individuals can be executed with respect to the plurality of the individuals by using the contactless communication tags 21, even if the numerical values corresponding to the plurality of the individuals are different, it is possible to save time and effort to be operated by human hands.

In the numerical operation system for the plurality of the individuals according to the second aspect, in the first aspect, the plurality of the aggregates 1 composed of the plurality of the individuals gathered in a certain range are used. In the numerical operation system for the plurality of the individuals, the total value is calculated for each of the aggregates 1.

According to this aspect, since the numerical values can be calculated for the plurality of the aggregates 1, it is possible to further save time and effort.

In the numerical operation system for the plurality of the individuals according to the third aspect, in the second aspect, the control unit 6 compares the total values of the plurality of the aggregates 1 with each other.

According to this aspect, the total values of the plurality of the aggregates 1 can be compared with each other, so that the user can grasp the total values and make some decisions about the aggregates 1.

In the numerical operation system for the plurality of the individuals according to the fourth aspect, in the third aspect, the control unit 6 determines superiority/inferiority by using the result of comparing the total values of the aggregates 1.

According to this aspect, for example, it is possible to compete with the total value for each of the aggregates 1, and it is possible to add interestingness when applied to a game.

In the numerical operation system for the plurality of the individuals according to the fifth aspect, in any one of the first to fourth aspects, the plurality of the individuals are configured to be mutually connectable.

According to this aspect, the aggregate 1 can be shaped by the plurality of the individuals, so that it is possible to add more fun.

The numerical operation system for the plurality of the individuals according to the sixth aspect further has the server 5 having the control unit 6, in any one of the first to fifth aspects. The server 5 acquires the numerical values each corresponding to the individuals and the operator symbols from the identification number stored in the contactless communication tags 21 to calculate the total value.

According to this aspect, it is possible to simplify the processing of the terminal possessed by the user.

In the numerical operation system for the plurality of the individuals according to the seventh aspect, in any one of the first to sixth aspects, the control unit 6 is configured such as to output the information of the total value to the display unit 43.

According to this aspect, the user can confirm the total value.

The configurations according to the second to seventh aspects are not essential configurations for the numerical operation system for the plurality of the individuals, and can be omitted as appropriate.

DESCRIPTION OF REFERENCE SIGNS

1: aggregate
2: assembly block
21: IC tag (contactless communication tag)
3: reader
31: reading unit
43: display unit
5: server
6: control unit

The invention claimed is:

1. A numerical operation system for a plurality of individual blocks comprising:
   a contactless communication tag each included in a plurality of individual blocks;
   a reader allowed to read the contactless communication tag; and
   a control unit to which a result read by the reader is input;
   wherein the control unit is configured such as to acquire, from the result read by the reader, at least numerical values each corresponding to the plurality of individual blocks and operator symbols for operating the numerical values to calculate a total value based on the numerical values and the operator symbols,
   a plurality of aggregates composed of the plurality of the individual blocks gathered in a certain range are used, and
   the control unit is further configured to:
   read the contactless communication tags for one aggregate with the reader,
   read the contactless communication tags for the other aggregate with the reader,
   calculate the total value for each of the aggregates, and
   compare the total values of the plurality of the aggregates with each other.

2. The numerical operation system for the plurality of individual blocks according to claim 1, wherein the control unit determines superiority/inferiority by comparing the total values of the aggregates.

3. The numerical operation system for the plurality of individual blocks according to claim 1, wherein the plurality of the individual blocks are configured to be mutually connectable.

4. The numerical operation system for the plurality of individual blocks according to claim 1 further comprising:
   a server having the control unit;
   wherein the server acquires, from an identification number stored in the contactless communication tag, the numerical values each corresponding to the plurality of individual blocks and the operator symbols to calculate the total value.

5. The numerical operation system for the plurality of individual blocks according to claim 1, wherein the control unit is configured to output the information of the total value to a display unit.

6. A numerical calculation method for a plurality of individual blocks executed in any one of a reader, a communication terminal and a server each including a control unit,
   wherein the control unit, to which a result read by a reader allowed to read a contactless communication tag each included in a plurality of individual blocks is input, executes a step of acquiring, from the result read by the reader, at least numerical values each corresponding to the plurality of individual blocks and operator symbols for operating the numerical values to calculate a total value based on the numerical values and the operator symbols,
   a plurality of aggregates composed of the plurality of the individual blocks gathered in a certain range are used, and
   the control unit further executes steps of,
   reading the contactless communication tags for one aggregate with the reader,
   reading the contactless communication tags for the other aggregate with the reader,
   calculating the total value for each of the aggregates, and
   comparing the total values of the plurality of the aggregates with each other.

7. A non-transitory computer-readable medium encoded with a computer program, the computer program causing a control unit, to which a result read by a reader avowed to read a contactless communication tag each included in a plurality of individual blocks is input, to execute a step of acquiring, from the result read by the reader, at least numerical values each corresponding to the plurality of individual blocks and operator symbols for operating the numerical values to calculate a total value based on the numerical values and the operator symbols, wherein a plurality of aggregates composed of the plurality of the individual blocks gathered in a certain range are used, and the program further causes the control unit to execute steps of, reading the contactless communication tags for one aggregate with the reader, reading the contactless communication tags for the other aggregate with the reader, calculating the total value for each of the aggregates, and comparing the total values of the plurality of aggregates with each other.

* * * * *